Nov. 18, 1969   J. J. KAPLAN   3,478,385
METHOD AND APPARATUS FOR REMOVING MEAT FROM ANIMAL CARCASSES
Filed Feb. 24, 1967   3 Sheets-Sheet 1
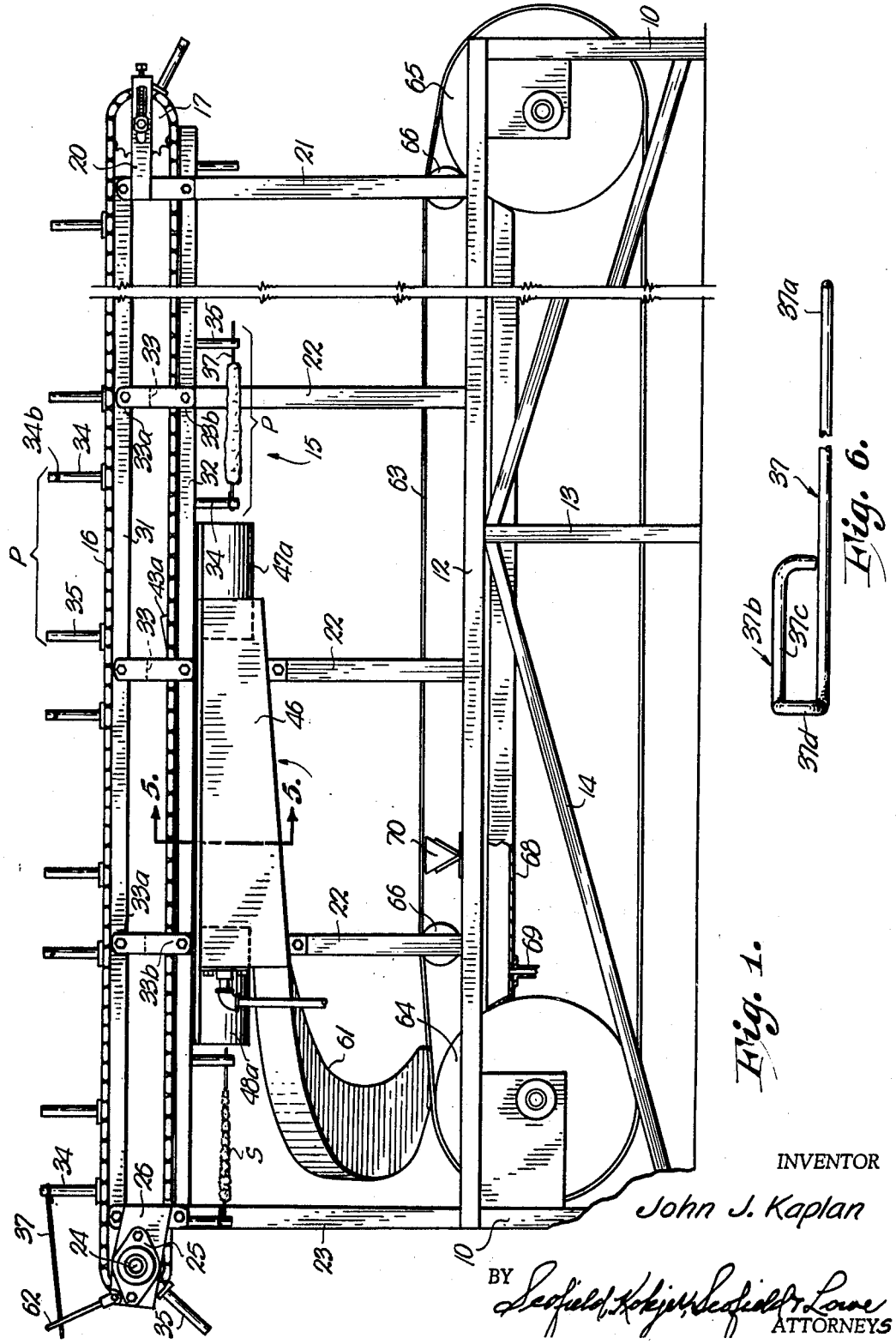
INVENTOR
John J. Kaplan

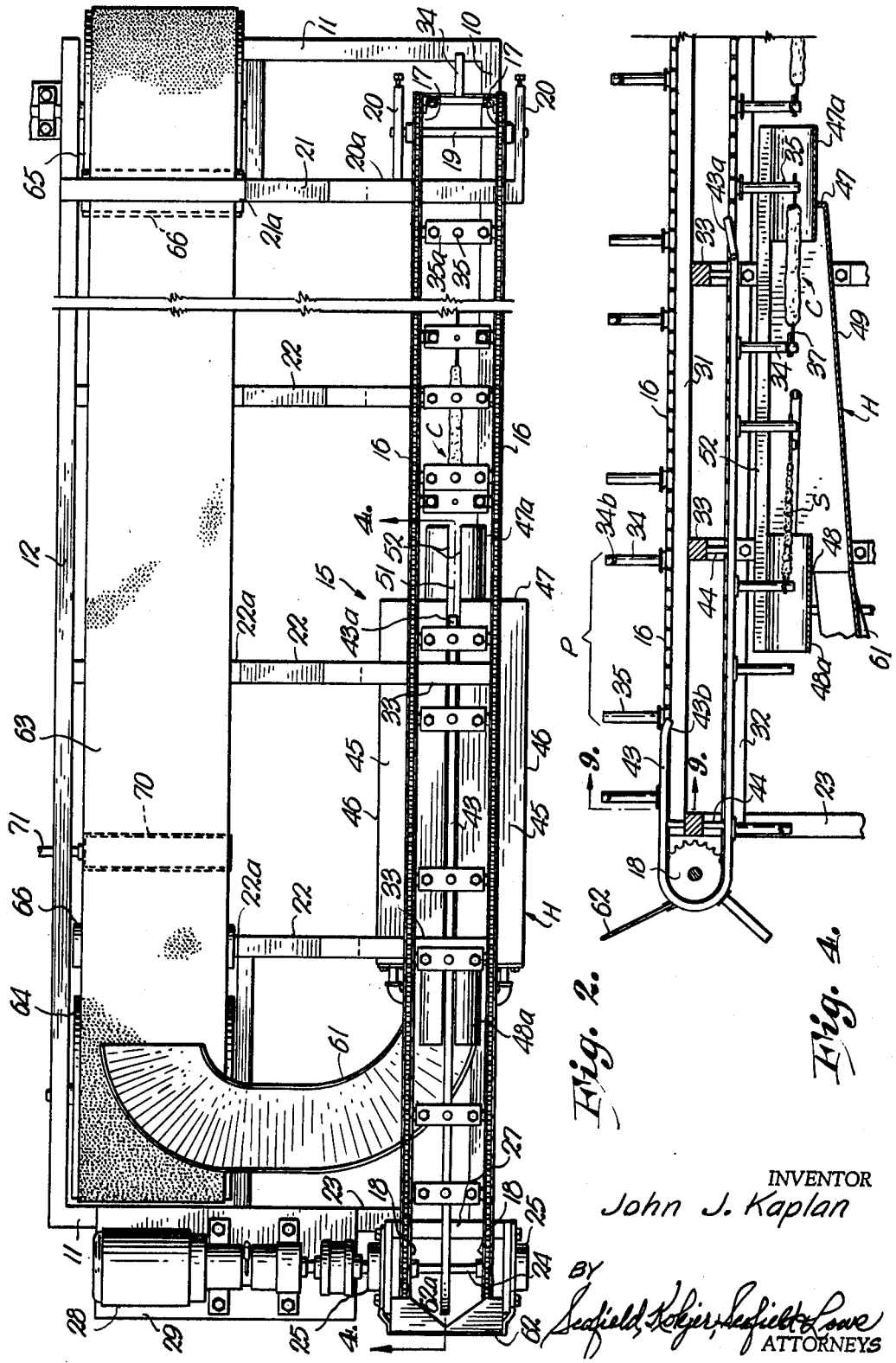

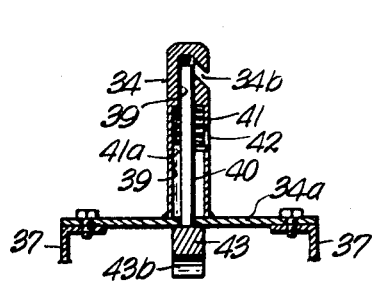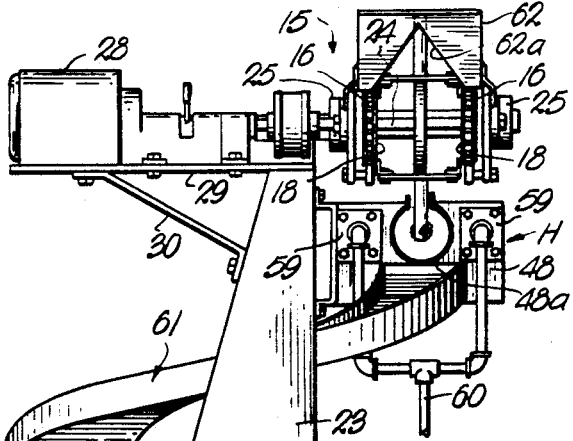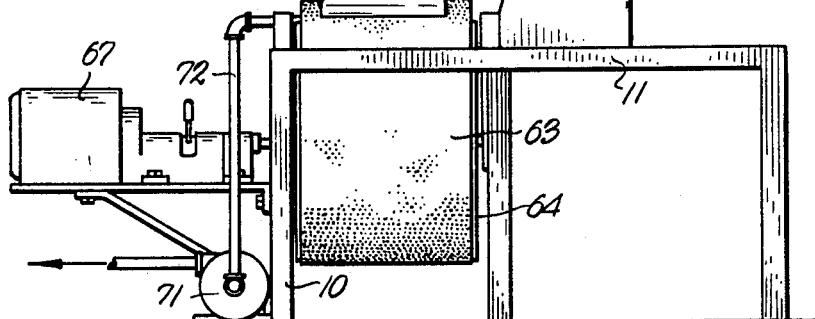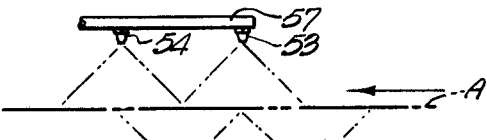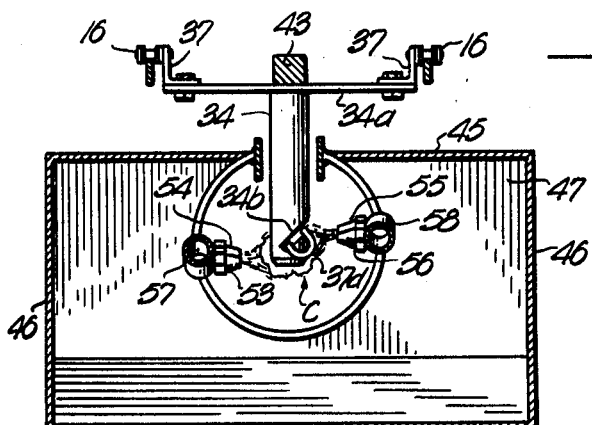
INVENTOR
John J. Kaplan

3,478,385
METHOD AND APPARATUS FOR REMOVING MEAT FROM ANIMAL CARCASSES
John Joseph Kaplan, Omaha, Nebr.
(1023 4th St., Council Bluffs, Iowa 51501)
Filed Feb. 24, 1967, Ser. No. 618,439
Int. Cl. A22c *17/00;* A22b *5/00*
U.S. Cl. 17—46                      5 Claims

ABSTRACT OF THE DISCLOSURE

The axial skeleton of a cooked carcass section is mounted free for rotation on substantially its central axis and high velocity fluid jets are directed laterally against the carcass, the jets being oriented transversely with respect to the carcass and offset from the central axis thereof to cause spinning of the carcass about the axes at sufficiently high speed to cause all the meat to separate from the carcass skeleton under the combined impact and centrifugal forces. Apparatus is provided for carrying out the method on a substantially continuous basis using jets of water for obtaining the spinning motion of the carcass sections. The apparatus includes special carriers for the carcass sections and means for disassociating the denuded skeletal portions of the carcass from the carriers.

SUMMARY OF THE INVENTION

The removal of meat from animal carcass sections having axial skeleton portions, for example vertebral columns, has long posed special problems to the meat processing industry. To my knowledge, two basic methods of attempting to separate the meat from the skeleton are employed. One requires the cracking and fragmenting of the skeleton in some sort of grinding machine with the attendant problems of obtaining subsequent adequate separation of the meat from the bone fragments and of bone fragment retention in the final product. The other involves impacting air, water or other streams or jets against the fleshy surface of the carcass section in an effort to strip the meat from the skeleton by force of the jets or streams. The latter method is embraced generally in the disclosures of such patents as Segur et al. 3,248,752; Goldberg 2,851,362; and Lindahl 3,089,775.

My invention relates generally to the second type of method discussed above, although for reasons which will appear, it differs substantially therefrom. The basic purpose of my method is to provide a meat removal process through which, amongst others, two highly improved results are obtained, viz (1) the complete removal of all meat from the carcass section within a very short time interval and (2) the production of meat of a much better quality from the standpoint of size of the meat fragments than is obtainable with presently known methods.

The method of my invention differs from prior methods known to me principally in the fact that the stripping of the meat from the skeletal structure is accomplished through supporting the skeletal structure of the carcass section for free rotation about the central longitudinal axis of the skeletal structure and impacting the fleshy part of the carcass section with high velocity streams or jets, preferably water, which are so oriented with respect to the carcass axis as to cause the carcass to rotate at high speed about such axis. During such rotation the meat is separated from the skeletal structure by a combination of centrifugal and impact forces while the skeletal portions are retained substantially in place. The high speed spinning action assists materially in obtaining a thorough disassociation of the meat from the skeletal structure and also promotes separation of the meat from the structure in the form of relatively large particles, at least during the initial phases of separation.

Another object of the invention is to provide a method for removal of meat from an axial skeletal structure which lends itself particularly well to performance by relatively simple automatic equipment with a high throughput rate. A special feature of one form of the method resides in the fact that the forces applied to the carcass sections are substantially balanced vis-a-vis the axis of the skeleton with the exception of the force couple which causes the carcass to spin. Thus the skeleton itself is subjected to a minimum of lateral or flexural forces which would tend to fracture it.

A still further object of the invention is to provide equipment for performing the method on carcass sections which are fed sequentially thereto and which in addition provides for automatic collection of the meat and separation of the bare or denuded skeletal structure from the supports on which they are mounted during the meat removal step. A feature of the invention in these respects resides in the means for supporting the carcass sections with particular reference to the manner of connection of the support means with the feeding mechanism.

Other and further objects of the invention, together with the features of novelty appurtenant thereto, will appear in the course of the following description.

DETAILED DESCRIPTION

In the accompanying drawings, which form a part of the specification and are to be read in conjunction therewith, and in which like reference numerals indicate like parts in the various views;

FIG. 1 is a front elevational view of a machine for performing the steps of and constructed in accordance with the invention, the break lines representing interrupted length;

FIG. 2 is a top plan view of same;

FIG. 3 is an end elevational view of same looking at the left hand end of the machine, as viewed in FIG. 1;

FIG. 4 is a fragmentary sectional view taken along the line 4—4 of FIG. 2 in the direction of the arrows;

FIG. 5 is a sectional view on an enlarged scale, taken along line 5—5 of FIG. 1 in the direction of the arrows;

FIG. 6 is an enlarged view of a carcass section support rod, the break line indicating interrupted length;

FIG. 7 is a diagrammatic representation in plan showing the horizontal spray nozzle spacing in relationship to the axis of the carcass support rod;

FIG. 8 is a diagrammatic representation in elevation showing the vertical spray nozzle spacing above and below the axis of the carcass support rod; and FIG. 9 is a sectional view on an enlarged scale taken along line 9—9 of FIG. 4 in the direction of the arrows.

In the description of the invention, steps of the method will be described in connection with a description of the apparatus for performing the method.

Referring to the drawing, the preferred machine for practicing the method according to the invention includes a rectangular base frame adapted to stand on a floor and which includes pairs of upright legs 10 at each end. Each pair of end legs 10 is joined transversely by a cross strut 11 and parallel members 12 extending from end to end of the frame and also joined at the legs 10 provide the longitudinal connections between the frame ends. The longitudinal members are supported at intervals by intermediate legs 13 and appropriate diagonal struts 14 serve to complete the basic frame structure. The height of members 12 above the floor is approximately waist height and, as will subsequently be seen, all components of the machine are supported far more by the basic frame structure.

The section of the machine wherein the meat is removed from the bones or skeletal structure is indicated generally by the reference numeral 15. This section comprises an endless chain conveyor having the side by side endless roller chains 16 which are trained about sprockets 17 at what will be termed the input end of the conveyor and about sprockets 18 at the opposite or discharge end. The sprockets 17 are mounted on a shaft 19 which in turn is supported by parallel brackets 20. The brackets 20 are secured at one end to and supported from a support member 20a which is cantilevered to and extends forwardly from an upright pedestal 21. Pedestal 21 extends upwardly from and is supported on the base frame.

It will be noted that there is a plurality of pedestals like pedestal 21, the pedestals being spaced at intervals along the frame. The intermediate pedestals are identified by reference numeral 22 and the pedestal adjacent the discharge end of the unit by 23. Each pedestal is directly supported on a cross member 21a, 22a or 11a, respectively, which extends between and is secured at its ends to the longitudinal members 12 of the base frame. The pedestals preferably taper in depth from the lower to the upper end, as can best be seen in FIG. 3.

At the so-called discharge end of the chain conveyor, the sprockets 18 are keyed to and supported on a drive shaft 24. Shaft 24 is journaled in bearings 25 which are mounted to brackets 26 bolted to and extending from a support member 27. Support member 27 is cantilevered to and extends forwardly from a pedestal 23. The shaft 24 is connected with a variable speed motor 28. A motor support platform 29 carries the motor, the platform being secured to the upper end of pedestal 23 and braced by the diagonal brace 30.

The upper flight of each chain is slidably supported on a horizontal rail or track 31 running longitudinally beneath the chain flight and the lower flight of each chain is supported on a similar track 32. The tracks are mounted on support members 33 which extend forwardly from and are secured to the forward upper ends of the intermediate pedestals 22. The members 23 are positioned vertically between the chain flights and have upwardly and downwardly projecting portions as at 33a and 33b to connect with and support the rails.

As will subsequently be explained in detail, the carcass sections from which the meat is to be removed are successively advanced through a meat removal housing H by pairs P of carrier members which are mounted on the chains 16. Each pair of carrier members comprises a front carrier post 34 and a rear post 35. Each such post has its base secured centrally to a plate 34a or 35a, respectively, which bridges between and is fastened at its ends to the respective chains 16. Brackets 37 serve in each case to connect the ends of the plates with the chains.

As can best be seen by referring to FIGS. 1, 4, 5 and 6, the carcass sections C (in the illustrated embodiment, turkey necks) are carried between posts 34, 35 on the lower flight of the conveyor. As will be subsequently dealt with in greater detail, each carcass section is rotatably supported on a rod 37 (detailed in FIG. 6) having a straight tip portion 37a on one end and bent portion 37b at the other. The bent portion has a rod length 37c bent parallel with and spaced away from the straight main portion of the rod and a laterally directed U-shaped portion 37d which forms the forward tip of the rod. The carcass section is mounted on the rod by manually threading the rod, tip portion 37a first, centrally through the cannular skeletal structure of the carcass section. The diameter of the rod from which the carcass support 37 is constructed should be somewhat less than the smallest inside diameter of the canals in the skeletal structure so that the carcass sections when mounted on the rods are freely rotatably thereon.

Each rod 37, when properly connected with its carrier P, has its straight tip end 37a threaded through an aperture in the post 35. The portion at the opposite end is received within a cut out 34b in post 34, which cut out is cut sideways on a plane inclined to the post axes into the post 34 (see FIGS. 5 and 9). The depth of cut out or slot 34b is such that the base thereof is located substantially on the central axis of the post. As will be evident, when connected with post 34 the rod 37 is held against rotation on its own major axis, the cooperation between the rod section 37c and the walls of slot 34b providing the resistance. In addition, the rod is restrained against accidental displacement back out of the cut out or slot 34b during the critical portion of its travel along the conveyor by means now to be described.

The rod restraining means is shown in FIG. 9. The post 34 is provided with a central bore 38 which terminates at its outer end in a reduced diameter bore 39 forming a continuation outwardly toward the tip of the post. A plunger 40 has its outer end portion slidably received and guided for longitudinal movement in the reduced diameter bore 39 with the other end portion extending slidably through an aperture in the support plate 34b for the post. The major portion of the plunger traverses the length of the bore 38 and the plunger is biased inwardly toward the carrier chain (or away from the base of cut out 34b) by a compression spring 41 which encircles the plunger in the bore 38. The outer end of the spring bears against the annular shoulder formed between bores 38 and 39. The inner end bears against a cross pin 41 inserted transversely through the plunger. An end portion of the pin 41 extends into a longitudinal slot 42 cut through the side wall of the post. The inner end of slot 42 limits the inward displacement of plunger 40 by engaging the pin.

During operation of the machine, the position of plunger 40 is controlled by a camming bar 43, best seen in FIGS. 4, 5 and 9. The bar runs parallel with chains 17 and is supported centrally therebetween by connectors like those shown at 44 in FIG. 4, which extend respectively downwardly and upwardly from the cantilevered conveyor support members 33. The camming bar has an inclined "lead in" end 43a which is located generally above the housing H. From end 43a the bar parallels the lower flight of the conveyor toward sprockets 18, is smoothly curved upwardly and rearwardly to correspond with the reversal of the conveyor at sprockets 18 and proceeds along the upper flight to a reversely inclined release end 43b. Except at the "lead in" and "release" ends, the outer surface of the camming bar is closely adjacent the path of the post support cross plates 34a and in engagement with the ends of the plungers 40, thus serving to maintain the plungers in the conditions shown in FIG. 9 during the travel along the camming bar. In this condition, the outer end of the pin serves as a gate or latch which blocks sidewise movement of the rod 37 out of the base of the cut out 34b and thus prevents separation of the rod from the posts 34 and 35.

As earlier mentioned, positioned beneath the lower flight of the conveyor toward the so-called discharge end thereof, is a housing H. The main portion of this housing is rectangular in cross section and has the top wall 45, parallel side walls 46, end walls 47 and 48, respectively, and the bottom wall 49. The bottom wall is inclined downwardly from wall 47 in the direction of travel of the lower flight of the conveyor. The housing is supported from two of the intermediate pedestals 22 by means of brackets 50 bolted to the pedestals (FIG. 3) and secured to the rearward side wall 46 of the housing.

The housing H is positioned to lie in the path of the carriers P and, as will be seen, temporarily encloses a mounted carcass section during its travel along the lower flight of the conveyor. So that the carriers and the rods 37 mounted thereon can move freely through the housing, the opposite end walls 47, 48 are provided with openings therethrough of sufficient size to permit the free longitudinal movement of a mounted carcass section C therethrough. Each opening has mounted therein a tubular section 47a, 48a, respectively, through which the carcass sections travel. A portion of each tube lies inside and another portion outside the housing. The tubular sections and the top wall of the housing are respectively provided with connecting longitudinal slots or openings defining a continuous opening 51 (FIG. 5) along the upper center thereof which accommodates and permits free travel of posts 34, 35 through the tubes and housing. The sides of opening 51 are defined by continuous partitions 52 running the length of the opening and secured to the side edges thereof. These partitions have portions above and below the plane of the top wall 45 of the housing.

The meat is removed from carcass sections C while they are within the housing H. Separation of the meat from the skeletal structure is accomplished through the action of high velocity water (jets) discharged from nozzles 53, 54, 55 and 56, which are located within the housing. Generally speaking, the jets from the nozzles are utilized to impart a high speed rotary motion to the carcass section about its central axis so that the meat is subjected not only to the force of the jets but also to a substantial centrifugal force tending to separate it radially from the bone structure.

In the preferred embodiment, these jet nozzles are four (4) in number, two on each side of the path which is followed by the carcass section during its travel through the housing H. The nozzles are fitted laterally into high pressure pipes 57, 58, respectively. Nozzles 53 and 54 are connected with pipe 57, and nozzles 55 and 56 with pipe 58.

The pipes extend into housing H through end wall 48, being secured thereto by detachable mounting plates 59 on the end wall. The spray pipes are connected through appropriate fittings and additional piping 60 with a high pressure pump (not shown) which in turn is connected with a convenient water supply or reservoir. The pump should have the capability of developing 1,000–2,500 p.s.i.

In the preferred embodiment of the invention, and as shown diagrammatically in FIG. 7, the spray nozzles are so positioned that the jets discharged therefrom are staggered longitudinally along the axis A of travel of the rods 37 through the housing. A preferred nozzle is one having the characteristics of the one currently sold by Spraying Systems, Bellwood, Ill., under its designation 730,154. The nozzles are of the type to produce a flat fan jet pattern and they are oriented so that the plane of each fan is substantially horizontal. The spacing of the jet nozzles 53, 54 is such that the adjacent respective fan edges intersect substantially on axis A, as is the case with the nozzles 55, 56. The thrust line, or center axis, of the spray pattern of nozzles 53 is substantially centered between the axes of the patterns of the opposed nozzles 55, 56 and the same are true of the thrust line of the jet from the nozzle 56 vis-a-vis nozzles 53, 54.

The vertical spacing of the water jets relative to the axis A is illustrated in FIG. 8. As is evident, nozzles 53, 54 have the planes of their jet fans offset upwardly with respect to the axis A while those of nozzles 55, 56 are offset below. Thus, as a carcass section is advanced along axis A on its carrier rod 37, the jets strike the carcass above and below its longitudinal axis of support and cause the carcass section to spin on the support rod 37. Also, the spacing of each spray jet plane is successively radially closer to the axis in the direction of movement of the carcass section.

The radial spacing of the jet planes relative to the axis A is important to obtaining the optimum spinning speed of the carcass section. Since the carcasses advance toward the left as viewed in FIG. 8, the jet of nozzle 53 will be the first to strike it. At this point, no meat has yet been removed and consequently, the carcass section has its maximum cross sectional thickness. As the carcass section moves axially along the path between the jets, they successively strike the section radially closer to the support axis since the jets are successively inset. Thus, even though meat is removed during the spinning process, the progressively closer radial spacing of the jets with respect to the axis of the carcass section compensates for the loss of meat and assures that a continuous rotational force will be applied. While I have not been able to measure with accuracy the true rotational speed of a carcass section when under the influence of the jets, it is quite substantial, and probably in the order of thousands of revolutions per minute. The spinning action serves to insure of complete separation of all meat from the skeletal structure. The skeletal sections have a scoured appearance when they emerge from the discharge end of the housing.

It will be noted that the housing H is preferably provided with a length such that the spinning action of the carcass section is not initiated until the carcass section is entirely within the housing. This necessitates locating the nozzles asymmetrically with respect to the midpoint of the housing, i.e. closer to the discharge end than to the input end. Thus, all meat is spun from the skeletal structure, is collected within the housing and is guided toward and onto the bottom wall 49.

The inner extending portions of the entry and discharge tubes 47a, 48a, plus the partitions 52 along the opposite sides of the top opening serve to assist in confining the water to the interior of the housing. In effect, they provide baffles which serve to intercept any water particles traveling toward these openings and to deflect it back into the housing.

The meat removed from the carcass sections within housing H is washed by the water collected within the housing out through an opening 48a in the end wall 48 of the housing. This opening communicates with the upper end of a curved flume or chute 61 which descends toward and delivers meat to that portion of the machine described below which separates the water from the meat. Skeletal portions S of the carcass section remain on rod 37 and are carried out of the housing and upwardly toward the bone stripper 62.

The bone stripper 62 comprises a plate which is mounted transversely of chains 16, being supported on the brackets 26. It is provided with a V-shaped notch 62a. The plate is placed so that the apex of the V lies in a horizontal plane below the maximum elevation of the cut outs 34b in post 34, which occurs in each case as the post assumes its vertical or upright position on the top flight after its turn up and around the sprockets 18. The notch is provided with sufficient depth to permit free passage of the post therethrough and the plate is so oriented that a rod 37 being carried by the post, once the post is past the plate, will be swung upwardly responsive to the tilting of the post toward the vertical, and thereby will be positioned in the apex region of the notch. This enables portions of the plate on opposite sides of the notch to engage the bones and hold them while the rod is drawn free. More will be said about this during the subsequent description of certain phases of the operation of the machine.

As earlier noted, the meat and water flow down the flume 61 and onto the upper flight of an endless conveyor 63. The conveyor 63 is foraminous, preferably being constructed of flexible perforated stainless steel sheet or strip. Two main rotary drums 64 and 65 provide the principal support for the conveyor and the upper flight is further supported by idler rolls 66 so that the central portion of the upper flight is elevated somewhat above the upper most surfaces of the drums 64 and 65. As is evident, the drums and idler rolls are supported by the main frame, suitable brackets being provided for mounting the bearings in which the shafts of the drums and rollers are journaled. An electric motor 67 is connected with the shaft of drum 65 and provides the driving power for the conveyor, the conveyor being so driven so its upper surface moves from left to right as viewed in FIGS. 1 and 2.

The flume 61 discharges onto the upper surface of conveyor 63 at a point between the departure of the conveyor from drum 64 and the engagement of the undersurface thereof with the initial idler roll 66. Positioned beneath the upper flight of the conveyor is a water catch basin or pan 68. The opposite ends of this pan preferably lie closely adjacent the surfaces of drums 64 and 65. The pan has a drain 69 which can be connected with any convenient drainage system in the vicinity where the machine is to be located.

Underlying the upper flight of the conveyor shortly downstream of the point at which flume 61 discharges onto the conveyor is a manifold 70 which extends transversely from one side of the conveyor surface to the other. The manifold 70 is preferably in the form of a closed end trough of V shape in cross section with the open upper portion of the trough in close association with the underside of the conveyor. A continuous suction is imposed upon the interior of manifold 70, the suction being provided by connecting the suction side of a pump 71 with the line 72 which communicates with the interior of the manifold through the outer end thereof.

OPERATION

While the steps to be performed in practicing the method and the operation of the machine are believed understandable from the description that has thus far been given, it may be helpful to review briefly a typical procedure.

Initially, cooked carcass sections C, for example, cooked turkey necks, are threaded onto rods 37 at some point either remote from or adjacent to the machine. The point is to have available at the input end of the machine a ready supply of carcass sections which are already threaded on the rods. If desired, a single operator can both thread the sections on the rods and quickly connect the rods with the carriers P in the manner that has been earlier described as the latter successively arrive at the operator's position. Obviously, by providing the machine with substantial length, it is possible to operate at increasingly faster rates, the rate depending principally on how fast the machine can be manually loaded.

The carriers P, with the carcass sections C thereon, are moved continuously through the meat removal housing H and while within the housing are subjected to the treatment earlier described. As it proceeds through the housing, each carcass section has the meat removed therefrom by the imposition of the centrifugal spinning forces applied therto and as it departs from the housing the only thing retained upon the rod 37 is the bone or skeletal structure of the carcass section.

The rods are thereupon carried on and upwardly toward the top of sprockets 18. However, as posts 34 begin to move in the arcuate path about the sprockets 18, the distance between the outer end of post 34 and its companion trailing post 35, through which the rearward end of the rod is threaded, becomes sufficiently great that the rod tip 37a will be drawn out of the aperture in post 35 which has carried it to this point. Since the rod is now freed at the rearward end, it will tend to assume a vertically inclined position and will swing on through the true vertical as the post 34 moves up around the sprocket 18. The bone may fall off the rod at this point, but if not the bone will be stripped completely from the rod as the rod is brought into engagement with the base of the V-notch in the stripper 62. The bones will thus be stripped from the rods. A receptacle (not shown) may be placed below the stripper section to collect the removed bones.

It should be noted that at the time of entry into the housing H the rod 37 becomes locked to post 34 due to engagement of the plunger 40 with the lead-in end 43a of the camming bar 43. Thus, the rod 37 is firmly held to the post 34 during its travel through the housing and all the way around the discharge end and across the initial part of the upper flight of the chain conveyor. However, as the post 34b reaches the release end 43b of the camming bar the plunger is permitted to descend under the influence of its biasing spring 41 and the plunger will thus be removed from its blocking engagement with the rod. Accordingly, the rod can now by gravity fall free out of the inclined cut out 34b into an appropriate receptacle (not shown).

The meat and water flow from housing H down through the flume 61 and onto the surface of the foraminous conveyor 63. The bulk of the water flows immediately through the perforations in the conveyor and into the drain pan. Any remaining water that is associated with the meat is removed at the vacuum manifold 70, which serves to impose suction on the meat particles as they pass thereover and draws water still adhering to the meat as well as that which may be adhering to the conveyor surfaces into and out of the manifold. The meat can be collected at the discharge end of the conveyor 63 in any appropriate manner, either by positioning receptacles therein or by some other means.

While the method has been described principally in terms of utilization of the invention for removal of meat from poultry necks, it is usable for other poultry sections as well, most notably rib cages which have the same cannulated central bone structure as the neck. However, as will be evident, it is applicable in principle to any meat carcass structure which is capable of being supported for high speed rotation about a central axis and I do not intend to limit the invention to treatment of poultry sections alone.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. The method for removing meat from animal carcass sections having axial skeleton portions comprising the steps of
    supporting and retaining the skeleton portions for free rotation on substantially the axis of the section, and
    impacting the section along the length thereof with a high velocity fluid stream having a main thrust line which is offset laterally from said axis whereby to spin the section on said axis and separate the meat from the carcass section.
2. The method as in claim 1, including
    impacting said section with a second fluid stream opposed in direction to the first named stream, the thrust line of said second stream being laterally offset from said axis in the opposite direction from the lateral offset of the thrust line of the first stream.
3. The method as in claim 1, including impacting said section with a plurality of successive streams, each succeeding one of which has its thrust line closer to said axis.
4. The method as in claim 1, including supporting the skeleton portion by inserting a rod axially therethrough and supporting the ends of the rod.
5. The method as in claim 1, wherein said carcass section is impacted with the fluid stream along the length thereof by advancing the section axially through the stream.

References Cited

UNITED STATES PATENTS

| | | | |
|---|---|---|---|
| 2,851,362 | 9/1958 | Goldberg | 99—107 |
| 3,089,775 | 5/1963 | Lindall | 99—107 |
| 3,248,752 | 5/1966 | Segur et al. | 17—45 |
| 3,364,518 | 11/1968 | Brown et al. | 17—45 |

FOREIGN PATENTS

| | | |
|---|---|---|
| 1,248,323 | 10/1960 | France. |
| 561,246 | 10/1932 | Germany. |

LUCIE H. LAUDENSLAGER, Primary Examiner

U.S. Cl. X.R.

17—1; 99—107